United States Patent [19]
Williams

[11] Patent Number: 5,202,522
[45] Date of Patent: Apr. 13, 1993

[54] DEEP WELL STORAGE OF RADIOACTIVE MATERIAL

[75] Inventor: Billy J. Williams, Ponca City, Okla.

[73] Assignee: Conoco Inc., Ponca City, Okla.

[21] Appl. No.: 712,231

[22] Filed: Jun. 7, 1991

[51] Int. Cl.$^5$ .............................................. B09B 1/00
[52] U.S. Cl. ................... 588/250; 405/128; 588/249
[58] Field of Search ............... 405/128, 129, 258, 57, 405/58, 52; 252/626, 633; 166/305.1, 308; 175/66, 206

[56] References Cited

U.S. PATENT DOCUMENTS

| | | | |
|---|---|---|---|
| 3,108,439 | 10/1963 | Reynolds et al. | 405/128 |
| 3,262,274 | 7/1966 | Nelson | 405/128 |
| 3,274,784 | 9/1966 | Shock et al. | 405/128 |
| 4,191,492 | 3/1980 | Cobbs . | |
| 4,321,158 | 3/1982 | Beall et al. | 405/128 X |
| 4,428,700 | 1/1984 | Lennemann | 405/129 X |
| 4,460,293 | 7/1984 | Richardson et al. . | |
| 4,815,894 | 3/1989 | Copson . | |
| 4,861,194 | 8/1989 | Lang . | |
| 4,863,311 | 9/1989 | Pirk . | |
| 4,877,353 | 10/1989 | Wisotsky . | |

FOREIGN PATENT DOCUMENTS

| | | | |
|---|---|---|---|
| 0004133 | 9/1979 | European Pat. Off. | 405/128 |
| 57867 | 8/1982 | European Pat. Off. . | |
| 3248592 | 7/1984 | Fed. Rep. of Germany | 405/128 |
| 3325774 | 2/1985 | Fed. Rep. of Germany . | |
| 2582141 | 11/1986 | France . | |
| 52-23872 | 2/1977 | Japan . | |
| 0023872 | 2/1977 | Japan | 405/128 |
| 59-19900 | 2/1984 | Japan . | |
| 7602753 | 3/1976 | Netherlands . | |
| 2034509 | 6/1980 | United Kingdom . | |
| 2141575A | 12/1984 | United Kingdom . | |

OTHER PUBLICATIONS

Low Specific Activity Scale Origin, Treatment and Disposal Report No. 6.6/127, Mar. 1987, E&P Forum, 25–28 Old Burlington St., London W1X 1LB.

Management and Disposal Alternatives for NORM Wastes in Oil Production and Gas Equipment, Oct. 1989, by Rogers & Assoc. Engineering Corp., 515 East 4500 South, Salt Lake City, Utah 84107.

Management and Disposal Alternatives for NORM Wastes in Oil Production and Gas Equipment, May 1990, by Rogers & Assoc. Engineering Corp., 515 East 4500 South, Salt Lake City, Utah 84107.

*Primary Examiner*—Dennis L. Taylor

[57] ABSTRACT

Radioactive waste is mixed with concrete and stored below any potable aquifers in a well casing traversing a stable geological hydrocarbon-containing formation. Salt water and/or hydrocarbon zones are sealed off with clean cement. Preferred storage is in offshore deep non-operating oil or gas wells.

20 Claims, 2 Drawing Sheets

DEEP WELL STORAGE OF RADIOACTIVE MATERIAL

BACKGROUND OF THE INVENTION

One of the nation's greatest environmental problems is the disposal of radioactive waste. Previous disposal options have met insurmountable environmental obstacles. Radioactive waste is accumulating continuously and rapidly with no visible disposal alternative.

It would be desirable to provide a disposal method which would meet the long term containment requirements essential for the confinement of radioactive waste.

THE PRIOR ART

Japanese Patent No. 52:23872 (Abstract Only) discloses a process for the disposal of industrial waste by employing offshore oil wells. The industrial waste is enclosed in lead to form capsules which are encased in a steel pipe with cement to make a buried bit. The bits are injected into the sea bottom oil well by high pressure air and are separated from each other in the well by injected concrete.

Great Britain Patent No. 2141575 discloses a method of disposing a nuclear waste material which comprises drilling a borehole from a drilling platform at an offshore site, removing units of waste material to the entrance of the hole, disposing of the units vertically in the hole and sealing the hole, for example, with concrete grouting. The waste material is positioned below the sea bed. The units of waste material are in the form of canisters or scaled pipe lengths filled with waste material.

Copson U.S. Pat. No. 4,815,894 discloses a method for constructing a large diameter subsea borehole for containing a shielded reactor core for a decommissioned nuclear submarine reactor core below the sea bed. The borehole is then sealed off from the environment by back filling with a cementitious material.

Wisotsky, Sr. U.S. Pat. No. 4,877,353 discloses an apparatus and method for disposal of radioactive waste. The waste is placed in containers which are positioned inside a hollow pile. The pile is driven into sediment which is preferably under extremely deep waters. Prior to placing the waste in the containers, the waste may be immobilized by incorporating it as a constituent in concrete. The patent also discloses surrounding the containers with a layer of concrete or resin.

Great Britain No. 2,034,509 discloses a process for the disposal of radioactive waste comprising lowering vessels containing radioactive waste into a storage shaft and sealing the shaft with a prefabricated sealing body. The body can be a metal, a dense ceramic, a lead alloy and the like.

Netherlands Patent No. 7,602,753 relates to a process for the disposal of radioactive waste which comprises drilling boreholes in a rock salt formation. The tops of the boreholes are sealed with a radiation screening material.

French Patent 2582141 discloses a method of storing radioactive waste in an underground conduit in a rock formation. The conduit forms a closed loop, waste is stored in the lower part of the loop and nuclear decay sets up a thermo siphon. A series of three plugs is used to seal vertical and horizontal shafts of the underground conduit.

European Patent 57867 discloses a multi-layer vessel for storing radioactive materials. The inner layer preferably comprises heat resistant steels, the outer layer is preferably of a zirconium based or titanium based material.

Lang U.S. Pat. No. 4,861,194 discloses a radioactive waste disposal apparatus comprising a cage for containment of waste, said cage being constructed so as to stack vertically with other similar cages. The cage is placed in a drilled shaft whose walls are sealed by lining the walls with steel pipe and concrete.

Cobbs U.S. Patent No. 4,191,492 discloses a method of installing a liner in a borehole. The liner can be delivered to the borehole in one continuous length.

Richardson et al. U.S. Pat. No. 4,460,293 discloses a method for lining a borehole with a stack of cylindrical lining segments.

Pirk et al. U.S. Pat. No. 4,863,311 discloses a liner for boreholes comprising tubular sections containing an inner ring, an outer ring, and an intermediate ring of an electro chemically nobler material. The joining of the tubular sections is carried out by welding the intermediate rings. During long terms of storage of radioactive material, the outer ring can be completely corroded away and the integrity of the lining remains due to the intermediate ring.

West German Patent 3,325,774 discloses the lining for a shaft comprising a mortar layer, a block wall, an asphalt layer, a steel layer, a reinforced concrete wall and a sheet of creep resistant lead. A synthetic resin adhesive bonds the sheet to the reinforced concrete. The shaft leads to underground storage caverns for radioactive waste material.

Japanese Patent No. 59:19900 relates to a storage structure for radioactive waste drums comprising two coaxial pipes separated by concrete and positioned underground. The structure is earthquake proof.

Management and disposal alternatives for NORM (Natural Occurring Radioactive Material) wastes in oil production and gas plant equipment, Rogers and Associates Engineering Corporation, October 1989, discloses the disposal of well tubing containing accumulated NORM scale in a well being plugged or abandoned.

Reclamation of the well site includes sealing several feet of the well with concrete grout or other suitable material, precluding significant access to materials at greater depths or surrounding formations. The well is capped to prevent inadvertent intrusion into the well. The reference also discloses injecting slurries or sludges of NORM into a well in a deep permeable formation below underground sources of drinking water. The formation is confined by impermeable layers that are likely to remain intact. Cement and clay are used to seal the top portion of the well. Here again the well is capped to prevent inadvertent intrusion.

THE INVENTION

The invention relates to a process for storing radioactive waste below potable aquifers in a stable geological hydrocarbon-containing formation which is traversed by a generally vertical steel tubular member. In the process, radioactive waste is mixed with concrete and placed in the steel tubular member, any hydrocarbon-containing zones are sealed off with clean concrete (concrete free of radioactive waste) and the top and bottom of that portion of the steel tubular member containing the mixture of radioactive waste is also sealed off with clean concrete.

In a preferred embodiment of the invention, the process is carried out in a deep offshore nonoperating hydrocarbon production well.

In another aspect of the invention, the tubular member or well casing contains a liner such as stainless steel which is resistant to corrosion.

In still another aspect of the invention, salt water bearing zones in the geological formation are sealed off with clean concrete.

DETAILED DESCRIPTION OF THE INVENTION

The deep well radioactive material storage process of the invention may be carried out either on land or under water, for example, under a lake bed or under the ocean floor. When the process is carried out on land, it is necessary that the radioactive waste be stored at a low enough level below the earth to be sure that it is below any potable aquifers. Since such aquifers are usually less than 500 feet below the surface of the earth, any storage 1,000 feet or more below the earth's surface will provide sufficient separation from such aquifers. Potable aquifers do not occur under the ocean floor and therefore, are not a factor in the storage of radioactive waste in such a locality.

Figure 1:
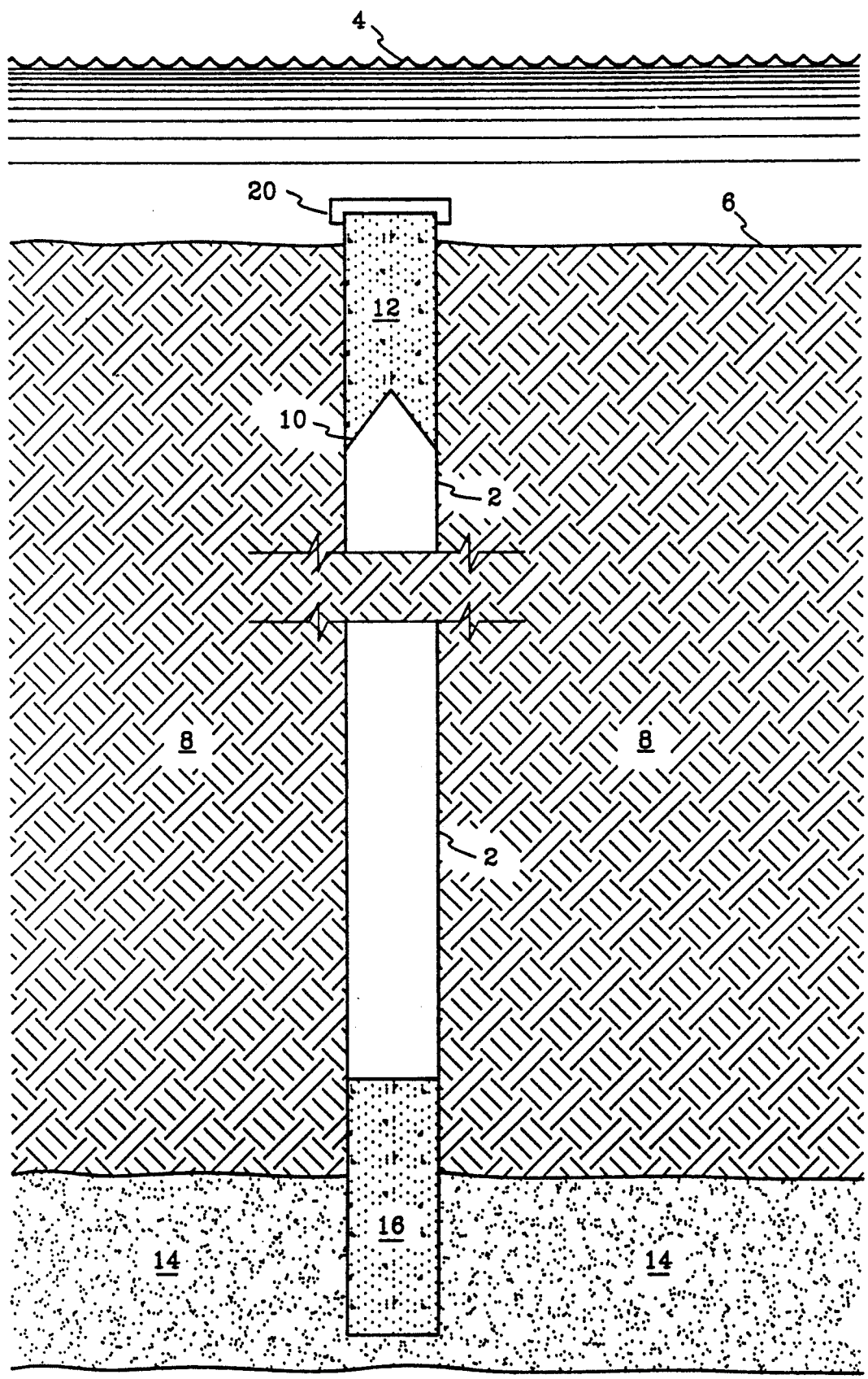
FIG. 1 is a schematic diagram of a subsea well disposed in a geological formation containing a hydrocarbon production zone.

FIG. 1 illustrates the arrangement which may be used in the storage of radioactive waste under a body of water. Referring to FIG. 1, an abandoned oil well casing 2 is located in a stable hydrocarbon-containing geological formation 8. Casing 2 projects above the bottom 6 of the body of water the top of which is designated by 4. Casing 2 which originally extended above the surface 4 of the water has been cut off at a point above the bottom 6 of the water and capped with a metal cap 20. Below the metal cap 20, there is installed a whipstock 10 with the space between whipstock 10 and cap 20 being filled with clean concrete 12. The bottom of casing 2 is located in a depleted hydrocarbon formation 14. The portion of casing 2 in formation 14 is filled with clean concrete 16 which extends a distance above formation 14. The interval between whipstock 10 and the top of the clean concrete plug 16 is filled with a stored mixture of concrete and radioactive waste.

The process of utilizing the storage arrangement shown in FIG. 1 is initiated by placing clean concrete plug 16 in the bottom of casing 2 to seal off hydrocarbon producing formation 14. The casing is then filled with a mixture of concrete and radioactive waste above which is installed whipstock 10, topped by clean cement plug 12. At this point, the casing is cut off above the bottom 6 of the body of water and cap 20 is installed on the casing. While cement plug 12 and cap 20 should provide adequate protection for the storage, whipstock 10 is installed in casing 2 to be sure that the integrity of the radioactive waste storage is maintained even if someone should in the future remove cap 20 and try to drill through the cement plug 12. In any such attempt, the drill would be deflected by whipstock 10 through the side of casing 2 and into formation 8, thus preventing any breach of the stored mixture of concrete and radioactive waste.

Figure 2:
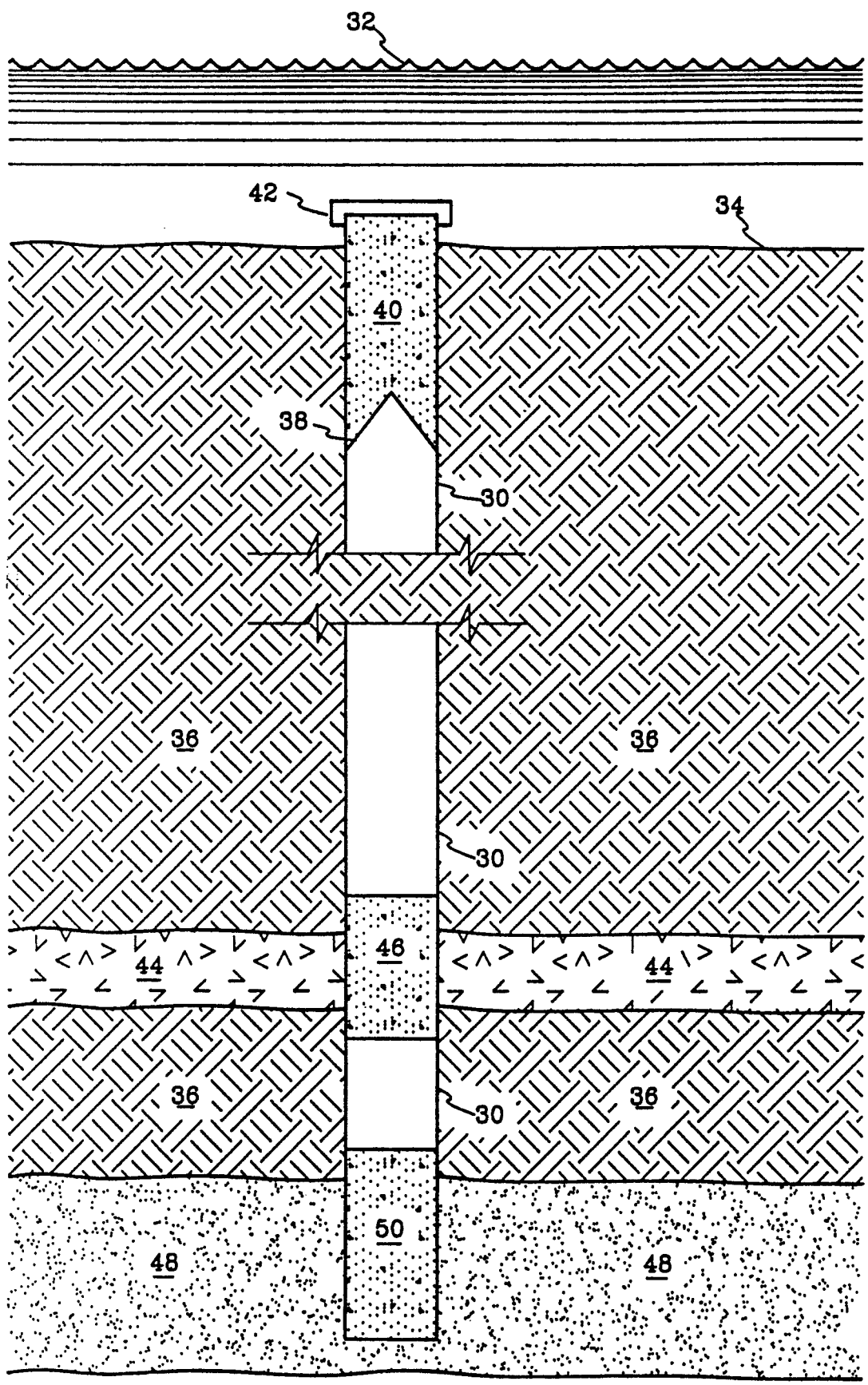
FIG. 2 is a schematic diagram of a subsea well disposed in a geological formation containing a hydrocarbon production zone and a salt water bearing zone.

Frequently, formations which contain hydrocarbon-producing zones also contain salt water zones. For effective and safe storage of radioactive waste, it is necessary that such salt water zones also be isolated from the radioactive waste. FIG. 2 shows a subsea arrangement for storing radioactive waste in a formation containing both hydrocarbon-producing and salt water zones. Referring to FIG. 2, a well casing 30 is disposed in a stable geological formation 36 containing a salt water zone 44 and a depleted hydrocarbon-producing zone 48. Hydrocarbon-producing zone 48 is sealed off from the remainder of the casing with a clean concrete seal 50. Salt water producing zone 44 is also sealed off from the rest of casing 30 with a clean cement seal 46. As in FIG. 1, the top of the casing which is located above the bottom 34 of the sea contains a whipstock 38 and a cap 42, with the space 40 between them being filled with clean concrete.

Sequentially, the storage process illustrated by FIG. 2 is carried out by first installing concrete seal 50 to isolate hydrocarbon-producing zone 48. The portion of the casing above zone 48 and below salt water zone 44 is then filled with a mixture of concrete and radioactive waste. Salt water zone 44 is then isolated from the rest of the casing with clean cement seal 46. Following this step, the casing above concrete seal 46 is filled with a mixture of radioactive waste and concrete. The remainder of the storage procedure then is continued as described in the discussion of FIG. 1.

For disposal of radioactive materials, a ten thousand year containment period is often proposed. For this extremely long term consideration, it is difficult to assume that the steel casing conventionally used in hydrocarbon production will last essentially forever. For example, steel casing used in a salt water bearing sandstone zone may experience slow corrosive degradation. Because of such corrosion, attack of reservoir salt water against the concrete plug of radioactive material may eventually occur. In order to guard against this eventuality, a liner, such as stainless steel may be placed inside the oil well casing.

A number of methods may be used to install a stainless steel liner. For example, a suitable liner may be installed by the use of a continuous sheet of thin stainless steel stock material. A continuous roll of the required length may be folded into the steel casing. This operation may be carried out from an operating platform floor by a simple metal forming device. The sheet stock may be added as a continuous tube for the desired length of the well. This type of procedure eliminates downhole joints and reduce labor.

The natural tendency of sheet metal to resist bending will effectively cause the stainless steel stock to form a good seal against the inside of the casing. This will eliminate the need for a mechanical seam. The weight of the concrete plug will effectively press the stainless steel liner against the inner casing wall. However, if desired a chemical sealer may be added. A number of such sealers which can be applied during the continuous placement of an inner liner are available commercially.

This additional containment system for radioactive material disposal is not necessary in all cases. It is expected that where the well bore does not penetrate salt water reservoirs, extra containment such as a stainless steel liner will not be required.

For the purposes of improved containment, stainless steel is an excellent liner material. However, the process of the invention is not intended to be so limited. Composites or plastics having high resistance to corrosion both chemical and electrolytic may also be used as liner materials. Suitable liners may be constructed from, but are not limited to, such materials as Teflon ®, Kevlar ®, or Hytrel ®, sold by DuPont, nylon or Rilson ®, which is sold by ATO Chemi, or Kevlar frit. The use of various types of lining materials in pipes is well known in the art as are the procedures for the installation of such linings.

The concrete and radioactive waste is prepared for storage by mixing the two together in any suitable equipment. After the mixing is complete, the mixture of radioactive waste and concrete is then pumped into the hydrocarbon-producing casing. The same apparatus may be used for the installation of the clean concrete plugs by taking appropriate steps to clean any radioactive material from the equipment prior to pumping the clean concrete.

For the purposes of the specification and the claims, the terms concrete and cement have been used interchangeably as either substance will provide the requisite strength and durability.

While certain embodiments and details have been shown for the purpose of illustrating the present invention, it will be apparent to those skilled in the art that various changes and modification may be made herein without departing from the spirit or scope of the invention.

I claim:

1. A process for storing radioactive waste below potable aquifers in a stable geological hydrocarbon-containing formation, said formation being traversed by a generally vertical steel tubular member, the process comprising:
   (a) sealing the bottom of said vertical steel tubular member in order to isolate any hydrocarbon containing zones
   (b) mixing the radioactive waste with concrete
   (c) placing the mixture of radioactive waste and concrete in the steel tubular member
   (d) sealing the top portion of the steel tubular member containing the mixture of radioactive waste and concrete.

2. The process of claim 1 in which the sealing is provided by clean concrete.

3. The process of claim 1 in which the tubular member contains a liner which is resistant to corrosion.

4. The process of claim 2 in which the liner is stainless steel.

5. A process for storing radioactive waste below potable aquifers in a stable geological formation, said formation being traversed by a steel casing of a non-operating hydrocarbon production well, the process comprising:
   (a) sealing the bottom of said steel tubular member in order to isolate any hydrocarbon containing zones
   (b) mixing the radioactive waste with concrete
   (c) placing the mixture of radioactive waste and concrete in the well casing
   (d) sealing the top portion of the steel tubular member containing the mixture of radioactive waste and concrete.

6. The process of claim 3 in which the sealing is provided by clean concrete.

7. The process of claim 6 in which the casing contains a liner which is resistant to corrosion.

8. The process of claim 7 in which the liner is stainless steel.

9. A process for storing radioactive waste below potable aquifers in a stable geological formation lying below the floor of a body of water, said formation being traversed by a steel casing of a non-operating hydrocarbon production well, said casing traversing at least one depleted hydrocarbon-producing zone, the process comprising:
   (a) sealing the bottom of said steel tubular member in order to isolate any hydrocarbon containing zones
   (b) mixing the radioactive waste with concrete
   (c) placing the mixture of radioactive waste and concrete in the well casing
   (d) sealing the top portion of the steel tubular member containing the mixture of radioactive waste and concrete.

10. The process of claim 9 in which the sealing is provided by clean concrete.

11. The process of claim 10 in which the body of water is offshore continental water.

12. The process of claim 11 in which the casing contains a liner which is resistant to corrosion.

13. The process of claim 12 in which the liner is stainless steel.

14. The process of claim 9 in which the casing also traverses at least one salt water formation and said salt water formation is also sealed off from the mixture of radioactive waste and concrete.

15. The process of claim 14 in which the sealing is provided by clean concrete.

16. The process of claim 15 in which the body of water is offshore continental water.

17. The process of claim 16 in which the casing contains a liner which is resistant to corrosion.

18. The process of claim 17 in which the liner is stainless steel.

19. The process of claim 9 in which the steel casing is cut off at the bottom of the body of water and the top portion of the remaining casing is sealed to contain the mixture of radioactive waste and concrete.

20. The process of claim 19 in which a whipstock is placed below the top seal in the steel casing and a steel cap is placed on the steel casing above the top seal.

* * * * *

UNITED STATES PATENT AND TRADEMARK OFFICE
CERTIFICATE OF CORRECTION

PATENT NO. : 5,202,522
DATED : April 13, 1993
INVENTOR(S) : Billy J. Williams

It is certified that error appears in the above-identified patent and that said Letters Patent is hereby corrected as shown below:

Column 6, Claim 6, line 9, "3" should be --5--.

Signed and Sealed this

Eighteenth Day of January, 1994

Attest:

BRUCE LEHMAN

Attesting Officer     Commissioner of Patents and Trademarks